April 7, 1931.  G. L. WADDELL  1,799,335
STUFFING BOX
Filed Aug. 10, 1928  2 Sheets-Sheet 1

April 7, 1931.  G. L. WADDELL  1,799,335
STUFFING BOX
Filed Aug. 10, 1928  2 Sheets-Sheet 2

Inventor
Gasper L. Waddell
By
Hardway Cathey
Attorney

Patented Apr. 7, 1931

1,799,335

UNITED STATES PATENT OFFICE

GASPER L. WADDELL, OF GOOSE CREEK, TEXAS

STUFFING BOX

Application filed August 10, 1928. Serial No. 298,682.

This invention relates to new and useful improvements in a stuffing box, and has particular relation to a novel type of gland embodied in the stuffing box.

One object of the invention is to provide in a stuffing box a gland which is adapted to surround and contain the stuffing box packing thus permitting a greater contact area of the packing with the rod or shaft packed.

A further feature of the invention resides in the provision of a novel type of packing gland adapted to receive the packing and hold the same assembled with the stuffing box and which is arranged so that when the gland is tight against the packing it will hold the packing yieldingly against the shaft or rod, which will prevent the burning or hardening of the packing in case the gland is screwed up too tight against the packing.

A still further feature of the invention resides in the provision of a stuffing box having a novel type of gland assembled with a yoke, whereby the gland is held against the packing, said gland being seated in a concaved bearing in the yoke to the end that the yoke, when tightened up, will impart pressure against the gland, along the axial line of the packing irrespective of whether the ends of the yoke are uniformly tight or not, thus preventing binding of the packing against one side of the rod or shaft packed and conducing to a uniform packing effect around said rod or shaft.

With the above and other objects in view the invention has particular relation to certain novel features of construction operation and arrangement of parts, an example of which is given by this specification and illustrated in the accompanying drawings wherein:—

Figure 1:
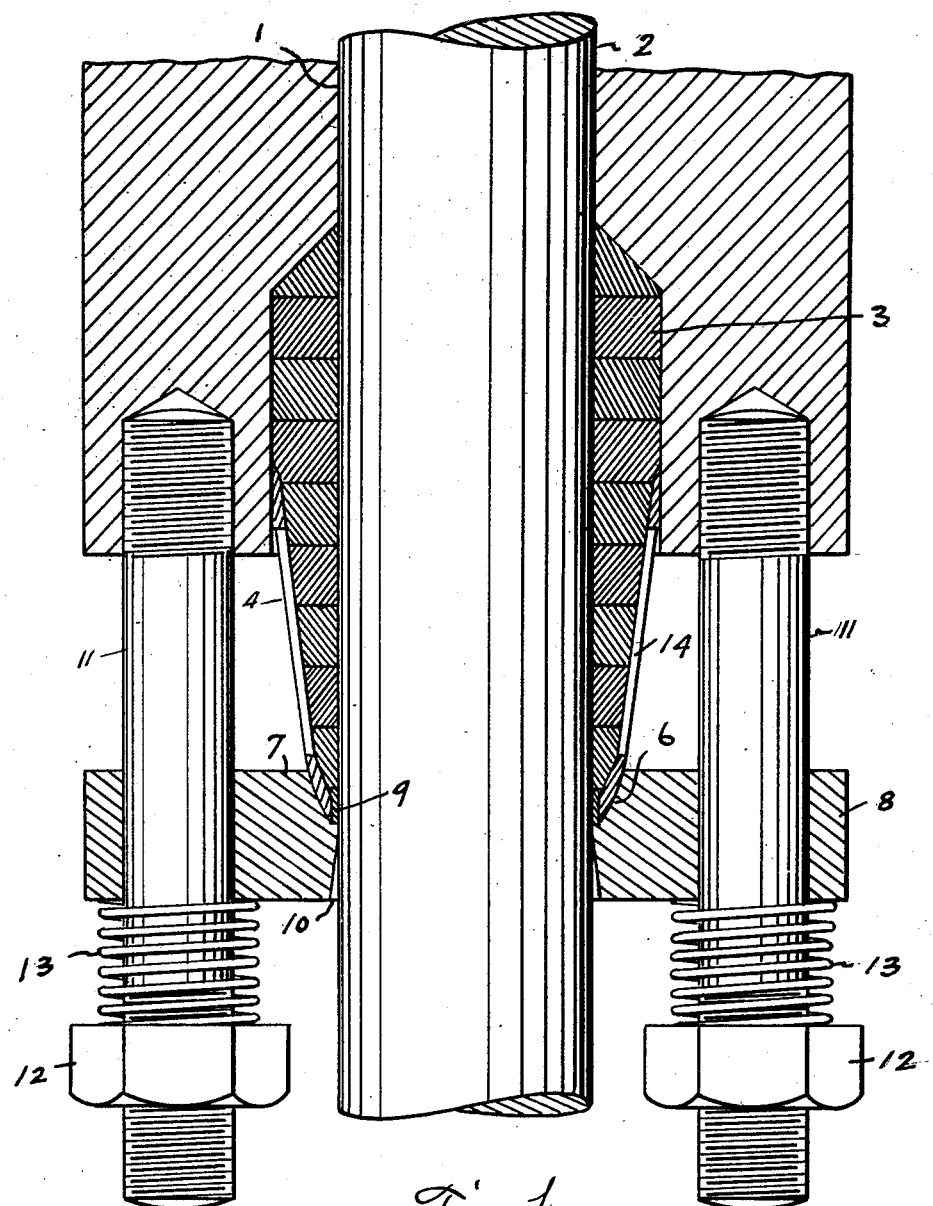
Figure 1 shows a longitudinal sectional view of the stuffing box.
Figure 2:
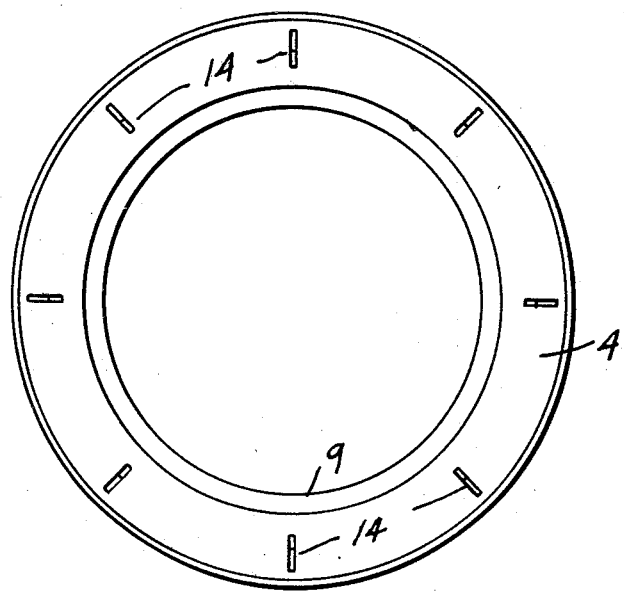
Figure 2 shows a plan view of the packing gland.
Figure 3:
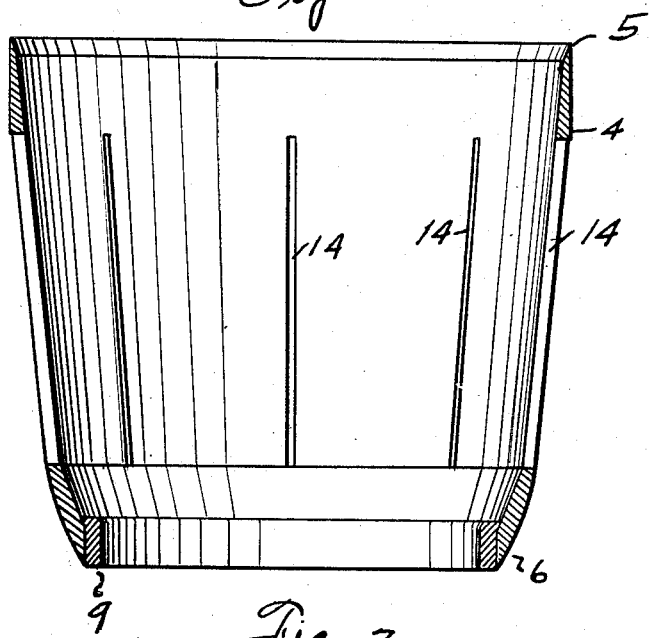
Figure 3 shows a longitudinal sectional view thereof.

Referring now more particularly to the drawings, wherein like numerals of reference designate similar parts in each of the figures, the numeral 1 designates a bearing wherein the rod or shaft 2 works. At one end the bearing is enlarged to receive the packing 3 which surrounds said rod or shaft. The numeral 4 designates a gland which is flared from one end to the other. The large end of the gland fits closely within the enlarged end of the bearing 1 and is outwardly beveled terminating in an edge 5. The other end of the gland is convex, as at 6 and is seated in a concaved bearing 7 in the yoke 8. This end of the gland has an annular bushing 9 therein which closely surrounds the shaft or rod 2. The yoke 8 has a bearing 10 through which the rod or shaft works, said bearing being outwardly flared.

Stud bolts 11 are anchored to the bearing member in which the bearing 1 is located. The yoke has end bearings on said bolts, and the outer ends of the bolts are threaded to receive the nut 12, 12, and springs 13 surround said stud bolts and are interposed between the nuts 12 and the respective ends of the yoke. The packing gland 4 has the longitudinal slits 14, spaced apart so that said gland will be expansible. The packing 3 fills the gland 4 which surrounds the packing, so that the packing has a long bearing on the rod or shaft 2. When the packing becomes worn the nuts 12 may be tightened up and in turn will force the gland 4 inwardly and the edge 5 of the gland will wedge between the packing and the adjacent walls of the bearing and will force the packing closely against the rod or shaft to be packed. The gland 4 being slitted will expand so as to permit the packing therein to yield and will prevent the packing from being burned by friction and from becoming too tightly packed and thus hardened.

In tightening up the yoke 8 should one end be tightened up more than the other the yoke may pivot, to a certain extent, about the adjacent end of the gland and this will prevent the binding of the gland against the packing on one side more than on the other, which, in turn, will prevent an uneven binding of the packing against the rod or shaft.

While I have shown what I now consider the preferred form of the invention it is obvious that mechanical changes may be made therein and equivalents substituted for the parts shown, and I reserve the right to make such mechanical changes and substitutions as may be found practical within the principle of the invention as defined by the appended claims.

What I claim is:—

1. In a stuffing box, a tubular, one piece gland having an inside packing seat adjacent one end, said gland being flared from said seat, and having lengthwise slots spaced apart therearound to permit expansion of the gland, the other end of said gland terminating in a continuous annular outwardly beveled edge shaped to fit closely against the bearing of said box.

2. A stuffing box adapted to be inserted into a rod bearing around the rod therein, said stuffing box comprising a one piece gland substantially flared and tubular in form, one end of which is fitted into said bearing, said flared end terminating in an annular outwardly beveled edge, packing in the gland and bearing, surrounding said rod and means for holding the gland and packing in assembled relation with the bearing, said means comprising a yoke adjacent the outer end of the gland, said yoke being formed with a concaved seat, the adjacent end of the gland being formed to conform to the contour of and fit within said seat.

3. In combination: a rod bearing enlarged at one end to receive a packing, a packing gland flared from one end to the other, the large end of the gland being outwardly beveled forming an annular edge which fits closely within the enlarged end of the bearing, packing within said enlarged end of said bearing around which the gland closely fits, means for holding the gland closely against the packing and for adjusting said gland to take up the wear of said packing said flared end of said gland being shaped to wedge closely between the wall of the bearing and the packing and to constantly force the packing in the gland closely against the rod which is packed.

In testimony whereof I have signed my name to this specification.

GASPER L. WADDELL.